No. 850,304. PATENTED APR. 16, 1907.
W. T. HOLLIS.
MEASURING MACHINE.
APPLICATION FILED OCT. 5, 1906.

2 SHEETS—SHEET 1.

Witnesses.
C. H. Gannett
J. Murphy

Inventor.
Warren T. Hollis
By Jas. H. Churchill
Atty.

UNITED STATES PATENT OFFICE.

WARREN T. HOLLIS, OF BOSTON, MASSACHUSETTS.

MEASURING-MACHINE.

No. 850,304.    Specification of Letters Patent.    Patented April 16, 1907.

Application filed October 5, 1906. Serial No. 337,523.

*To all whom it may concern:*

Be it known that I, WARREN T. HOLLIS, a citizen of the United States, residing in Boston, in the county of Suffolk and State of Massachusetts, have invented an Improvement in Measuring-Machines, of which the following description, in connection with the accompanying drawings, is a specification, like letters on the drawings representing like parts.

This invention relates to a measuring-machine of that class in which a pointer or index is responsive to the movement of a rotatable member actuated by the article being measured.

The present invention has for its object to provide a machine of the class described of increased efficiency and accuracy, and for this purpose provision is made for positively connecting the pointer or index with the rotatable member, whereby said pointer is moved simultaneously with the said rotatable member, while provision is also made for permitting bodily movement of the rotatable member without disturbing its relation or connection with the pointer or index. These and other features of this invention will be pointed out in the claims at the end of this specification.

Figure 1:
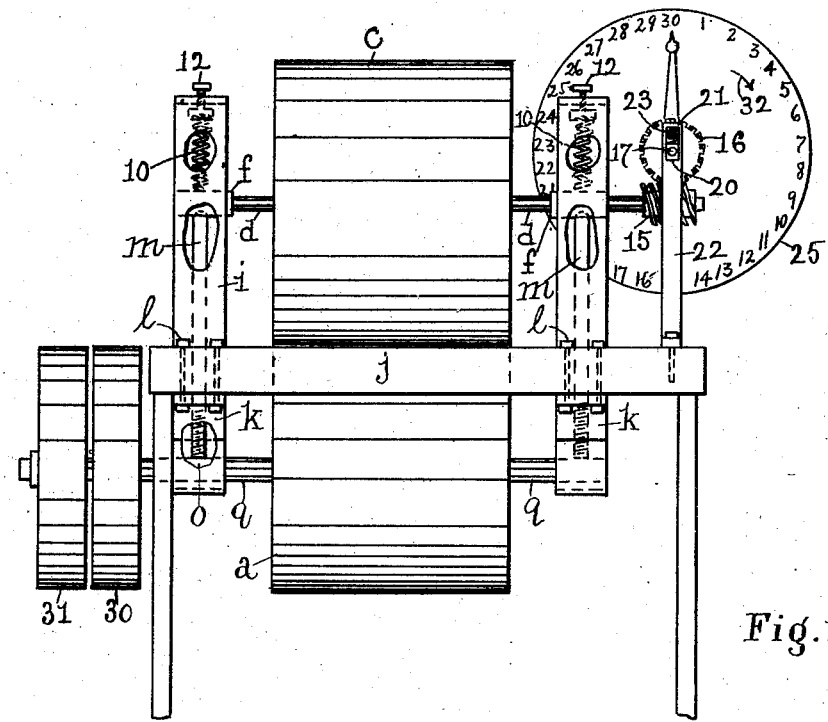
Figure 2:
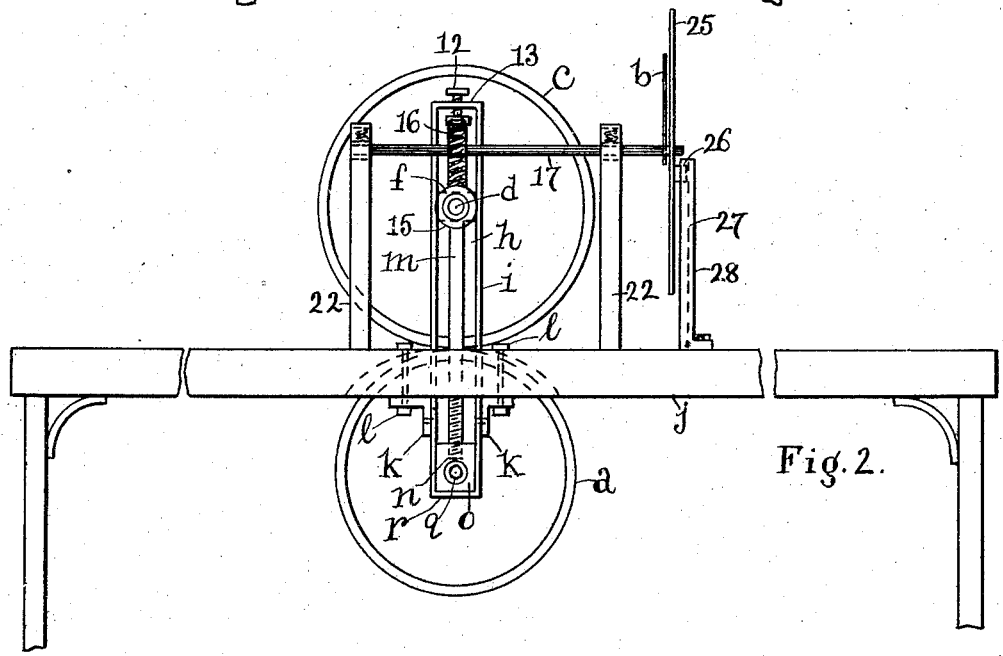
Figure 3:
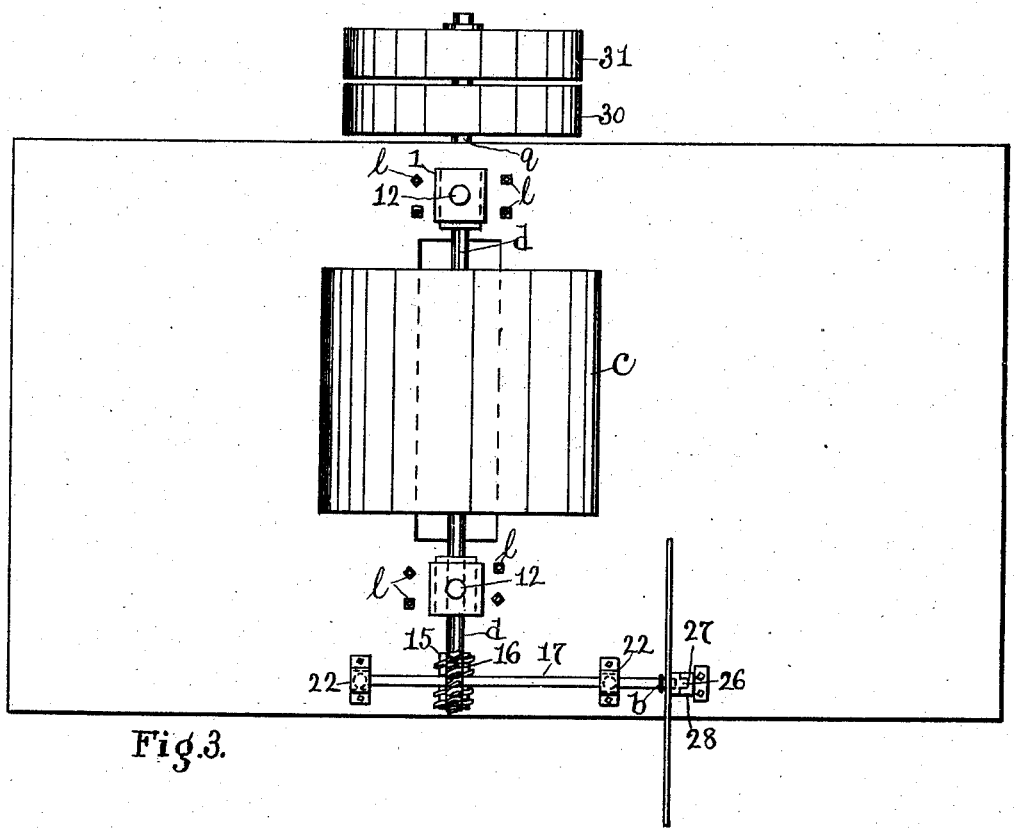

Figure 1 is a front elevation of one form of machine embodying this invention; Fig. 2, a side elevation of the machine shown in Fig. 1, and Fig. 3 a plan view of the machine shown in Fig. 1.

In the present instance I have shown the invention as embodied in one form of machine which is adapted for measuring the length of strips or pieces of material—such, for instance, as leather.

The machine herein shown is provided with a rotatable bed-roll $a$ and with a rotatable member, which is positively connected with a pointer or index $b$. The rotatable member may be made in the form of a roll, disk, or wheel $c$ or of other desired or suitable form and in the present instance is represented as a roll having a shaft $d$, mounted to rotate in boxes $f$, movable in slots or guideways $h$ in uprights $i$, extended above and, as herein shown, also below a table $j$, to which the uprights are fastened by suitable brackets $k$ and bolts $l$.

The journal-boxes $f$ are normally supported by rods $m$, which have their lower ends threaded to enter threaded sockets $n$ in bearing blocks or boxes $o$ for the shaft $q$ of the bed-roll $a$. The journal-boxes $o$ are stationary and rest upon the bottom walls $r$ of the guideways $h$. The upper ends of the supporting-rods $m$ may be rounded or pointed to enter correspondingly-shaped sockets in the under side of the journal-boxes $f$, which are normally held down in engagement with the supporting-rods $m$ by springs 10, the pressure of which may be regulated by adjusting-screws 12, extended through the top wall 13 of the slotted uprights $i$. By turning the rods $m$ in their threaded sockets the journal-boxes $f$ may be moved upward against the action of the springs 10, so as to adjust the rotatable member or roll $c$ with relation to the bed-roll $a$, according to the thickness of the material to be measured—such, for instance, as leather—and thereby insure rotary movement of the member or roll $c$ from the driving member or bed-roll $a$ when the leather or other material is nipped or engaged by both rolls, the member or roll $c$ being thus rotated as long as the material is engaged with it and the bed-roll. This rotary movement of the roll $c$ is transmitted to the pointer or index $b$, and provision is made whereby said pointer or index moves simultaneously with and is positively driven by said roll. In the present instance I have shown one form of mechanism for effecting this result, which consists of a worm 15, fast on the shaft $d$ of the rotary member $c$, which worm meshes with and rotates a worm-gear 16, fast on the shaft 17, carrying the pointer or index $b$. The shaft 17 is arranged horizontally substantially at right angles to the shaft of the roll $c$ and is journaled in boxes 20, (see Fig. 1,) movable in guideways 21 in uprights 22, erected upon the table $j$, said journal-boxes being normally held down on the bottom of the guideways 21 by springs 23.

The pointer or index $b$ coöperates with a dial 25, having suitable graduations and loosely mounted on the shaft 17. Provision is made for permitting the dial 25 to move bodily with the shaft 17 and in a fixed path, which may be accomplished, as herein shown, by one or more studs or projections 26 on the back of the dial extended into a suitable slot 27 in an upright 28, erected upon the table. In this manner the relation of the pointer to the dial is maintained the same, irrespective of the bodily movement of the pointer under the influence of different thickness of material. The rotation of the bed-roll $a$ may be effected in any suitable manner, and in the present instance its shaft $q$ is provided with fast and loose pulleys 30 31.

In operation with the machine herein shown the rotatable member $c$ is adjusted or positioned with relation to the bed-roll or driving member $a$ so as to leave a space between them substantially equal to the thickness of the material to be measured and such as to insure rotation of the member $c$ as the said material is drawn or fed between said members. The material to be measured is then placed in the bite of the members or rolls $c$ $a$ and the machine is set in operation, as by throwing the driving-belt (not shown) from the loose pulley 31 onto the fast pulley 30. Rotation of the member $c$ effects rotation of the pointer-shaft 17 by the positive connection or gearing between the shaft $d$ of said member and said pointer-shaft, which connection is shown as the worm 15 and worm-gear 16. The pointer $b$ is thus moved over the dial 25, and its forward movement in the direction indicated by the arrow 32, Fig. 1, is arrested as soon as the material passes out of engagement with the rotatable member $c$. Variations in the thickness of the material are taken care of by the bodily movement of the member $c$, which is moved upward by an increased thickness in the material. The member $c$ on its upward movement carries with it the worm 15, worm-gear 16, pointer-shaft 17, its pointer $b$, and the dial 25, and when a thinner portion passes under the member $c$ the same parts are moved downward by the springs 10. It will thus be seen that while the pointer is positively connected with the rotatable member $c$, so as to be rotated or moved simultaneously therewith, yet said rotatable member is capable of responding to variations in the thickness of the material without affecting the relation of the parts or the accuracy of the machine.

I may prefer to employ the gearing herein shown, comprising the worm 15 and worm-gear 16; but I do not desire to limit my invention in this respect.

I have herein shown the invention as embodied in a machine having a single rotatable member and which is designed for measuring lengths; but I do not desire to limit myself in this respect. So, also, I have herein shown the rotatable member $c$ as a roll, disk, or wheel having a full periphery; but I do not desire to limit the invention in this respect.

I claim—

1. In a measuring-machine, in combination, a rotatable member actuated by the material to be measured, and provided with a shaft, boxes in which said shaft is journaled, upright guides in which said boxes slide, adjustable supports for said boxes, a worm on said shaft, a worm-gear in mesh with said worm, a shaft on which said worm-gear is mounted, a pointer on the worm-gear shaft, a dial loosely mounted on said pointer-shaft and coöperating with said pointer, and means to guide said dial in its movement with said pointer-shaft, substantially as described.

2. In a measuring-machine, in combination, a rotatable member actuated by the material to be measured, a shaft on which said member is mounted, sliding boxes in which said shaft is journaled, a pointer or index, a shaft on which said pointer or index is mounted to turn, sliding boxes in which said pointer-shaft is journaled, and gearing connecting said pointer-shaft with the shaft of said rotatable member, substantially as described.

3. In a measuring-machine, in combination, a bed-roll, a rotatable member coöperating with the said bed-roll and actuated by the material passed between the same, a shaft on which said rotatable member is mounted, sliding boxes in which said shaft is journaled, a pointer, and dial coöperating therewith, a shaft on which said pointer and dial are mounted, sliding boxes in which said pointer-shaft is journaled, gearing connecting said shafts, and means to restrain said dial from rotary movement on said pointer-shaft while permitting said dial to move therewith, substantially as described.

4. In a measuring-machine, in combination, a rotatable member actuated by the material to be measured and bodily movable to compensate for different thicknesses of material, means for guiding said member in a substantially straight path in its bodily movement, a pointer, a bodily-movable shaft on which said pointer is mounted, means for guiding said pointer-shaft in a substantially straight path in its bodily movement, and means for connecting said pointer-shaft with the shaft of said rotatable member, substantially as described.

5. In a measuring-machine, in combination, a bed-roll, a rotatable member coöperating with said bed-roll and actuated by the material passed between the same, means for exerting a yielding pressure on said member, means for regulating the said pressure, a pointer or index, a shaft on which said pointer is mounted to turn therewith, and gearing for positively connecting said pointer-shaft with said rotatable member, said gearing being bodily movable with said member, substantially as described.

In testimony whereof I have signed my name to this specification in the presence of two subscribing witnesses.

WARREN T. HOLLIS.

Witnesses:
JAS. H. CHURCHILL,
J. MURPHY.